United States Patent [19]
Schwartz, Albert B.

[11] 3,853,743
[45] Dec. 10, 1974

[54] REMOVAL OF ORGANIC CATIONS FROM CRYSTALLINE ALUMINOSILICATES

[75] Inventor: Schwartz, Albert B., Philadelphia, Pa.

[73] Assignee: Mobile Oil Corporation, New York, N.Y.

[22] Filed: Feb. 15, 1973

[21] Appl. No.: 332,970

Related U.S. Application Data

[63] Continuation-in-part of Ser. No. 27,182, April 9, 1970, abandoned.

[52] U.S. Cl. .............................. 208/111, 252/455 Z
[51] Int. Cl.... C10g 13/02, C10g 11/02, B01j 11/40
[58] Field of Search .................. 252/455 Z; 208/111

[56] References Cited
UNITED STATES PATENTS

| | | | |
|---|---|---|---|
| 3,130,006 | 4/1964 | Rabo et al. | 252/455 Z |
| 3,404,086 | 10/1968 | Plank et al. | 208/120 |
| 3,700,585 | 10/1972 | Chen et al. | 208/111 |

*Primary Examiner*—C. Dees
*Attorney, Agent, or Firm*—Andrew L. Gaboriault; Raymond W. Barclay; Claude E. Setliff

[57] ABSTRACT

Organic cations are removed from crystalline aluminosilicates containing the same by heating in an atmosphere consisting essentially of ammonia or of mixtures of ammonia and nitrogen at a temperature in the approximate range of 500°–1,000°F.

13 Claims, No Drawings

REMOVAL OF ORGANIC CATIONS FROM CRYSTALLINE ALUMINOSILICATES

CROSS-REFERENCE TO RELATED APPLICATIONS

This application is continuation-in-part of application Ser. No. 27,182, filed Apr. 9, 1970, and now abandoned.

BACKGROUND OF THE INVENTION

1. Field of the Invention

This invention relates to the removal of organic cations from crystalline aluminosilicates containing the same. More specifically, this invention relates to a method in which an organic cation-containing aluminosilicate is heated in an atmosphere of ammonia to a temperature between about 500°F. and about 1,000°F. until a substantial portion of the organic cation has been removed mixtures of ammonia and nitrogen are also useful.

2. Description of the Prior Art

The process of calcining a crystalline aluminosilicate to remove non-organic cations, such as ammonium, is well known in the prior art. For example, U.S. Pat. No. 3,130,006 describes the heating of an ammonium zeolite at temperatures between 350° and 600°C in an atmosphere of either dry air, dry nitrogen, dry hydrogen or in a vacuum. U.S. Pat. Nos. 3,404,086 and 3,541,027 teach heating ammonium zeolites in the presence of ammonia or ammonia plus steam.

Prior art also includes the heating of ammonium zeolites in non-oxidative atmospheres such as steam, in order to produce the hydrogen form of the particular zeolite. U.S. Pat. No. 3,337,474 illustrates this technique at temperatures that range between 700° and 750°C.

Recently, aluminosilicates containing organic cations, particularly quaternary ammonium ions have been calcinend in an atmosphere such as air at temperatures between 200° and 600°C to produce the hydrogen form of zeolites such as are described in U.S. Pat. Nos. 3,314,752 or 3,414,602.

With regard to the latter two patents, it is known, not only from the work described herein, but also from the prior art (as e.g., U.S. Pat. No. 3,541,027) that severe conditions cause irreversible decationization. Thus, U.S. Pat. No. 3,541,027 teaches such decationization with steam and/or elevated temperatures; the disclosure herein teaches air calcination will also cause loss of cation sites.

The two patents above which related to organic ammonium zeolites teach that calcination may be done in an air atmosphere up to about 700°C. However, as has just been mentioned, this will cause permanent cation loss. The other patents suggest that in order to prevent decationization in connection with ammonium (non-organic) zeolites, an atmosphere of steam and aammonia during calcination is necessary. Therefore, none of the art mentioned discloses or suggests the calcination of organic ammonium zeolites in an atmosphere of ammonia to curtail cation site loss and to increase catalyst activity.

Summary of the Invention

This invention provides a method for removing organic cations from crystalline aluminosilicates zeolites by heating in an atmosphere consisting essentially of ammonia or of mixtures of ammonia and nitrogen. This method allows the treatment to be carried out under lower temperature conditions than was possible when calcination was conducted in an oxidizing atmosphere. These lower temperatures provide for removal of the organic cation while preventing the loss of crystallinity and preserving cationic sites in the zeolite catalyst and improving catalyst activity.

This invention comprises heating the organic cation-containing crystalline aluminosilicate at a temperature between about 500°F and about 1,000°F, with a preferred temperature between about 600°F and about 800°F, in an atmosphere of ammonia or of mixtures of ammonia and nitrogen for a time between about 5 minutes and about 24 hours with a preferred time of about 10 minutes to about 10 hours. The zeolite may thereafter be cooled conventionally. The treated zeolite may then be calcined in air if desired.

Description of Specific Embodiments

This process contemplates the removal generally of organic cations from crystalline aluminosilicate zeolites containing the same. Illustrative of particular zeolites that can have organic cations removed by this method are zeolite ZSM-4, described in Example 1; ZSM-11 described in Example 13; sodalite, described in Example 11; ZSM-5 described in Belgian Pat. No. 713,576; tetramethylammonium zeolites of the type described in U.S. Pat. No. 3,306,922; ZK-4 described in U.S. Pat. No. 3,314,752 and ZK-5 described in U.S. Pat. No. 3,247,195. Illustrative of the type of organic cations that can be removed from these zeolites are the nitrogen and phosphorous containing cations such as tetraalkylammonium, tetraalkylphosphonium, trialkylammonium, dialkylammonium, nonalkylammonium, arylammonium, alkylarylammonium and polyquaternary ammonium. More specific illustrative ions are tetramethylammonium, diethylammonium, butylammonium, trimethylphenylammonium, trimethylbenzylammonium, and N, N'-dimethyltriethylene diammonium.

In some cases excess organic reagents, which provide the source of the organic cations in the synthesis of the zeolite, may be occluded by the zeolite. The treatment with ammonia is also effective for removal of this organic material. Examples of types of organic compounds which might be occluded in the zeolite during crystallization are quaternary ammonium salts and amines.

The tetramethylammonium ion is preferably removed in an atmosphere of ammonia. When ammonia is the atmosphere some ammonia will be adsorbed on the catalytic surface. This ammonia can be removed by washing, ion exchange and/or heating the zeolite. The removal of the tetramethylammonium ion from the ZSM-4 zeolite results in a substantially more active hydrogen form of catalyst than one prepared by very careful calcining in an oxidizing atmosphere.

The removal of the tetrabutylphosphonium cation from ZSM-11 in an ammonia atmosphere with corresponding increase in activity can be achieved.

The treating atmospheres may be pure ammonia or ammonia diluted with an inert gas. For example, 5 to 95 percent volume ammonia may be mixed with 95 to 5 percent volume nitrogen. Preferably at least 10 percent volume ammonia should be present in the treating atmosphere.

The following examples will illustrate the advantages of this invention:

EXAMPLE 1

Zeolite ZSM–4 was prepared by mixing 24.0 grams of sodium aluminate, which contained 30 weight percent $Na_2O$ and 43.5 weight percent $Al_2O_3$, 193 grams of 98.4 weight percent NaOH, 765 grams of water and 344.0 grams of Q-brand sodium silicate which contained 28.9 weight percent $SiO_2$ and 8.9 weight percent $Na_2O$. This mixture was heated at 50° – 60°C. for 30 minutes and to it was added 1,350 grams of Q-brand sodium silicate, and a solution of 237.5 grams of $Al_2(SO_4)_3 0.14\ H_2O$, 123.5 grams of $H_2SO_4$ (97.4 weight percent) and 750 grams of water. The resulting slurry was filtered and 2,024 grams of filter cake was recovered. 120 grams of 10 weight percent aqueous NaOH and 60 grams of 24 weight percent methanolic tetramethylammonium hydroxide solution were mixed into the filter cake. The resultant smooth paste was then crystallized at 100°C in a steam box for 4 days.

The above process was repeated twice and the three batches of crystalline product in the mother liquor were composited, washed with water and dried at 120°C. The composition of this product was as follows:

Carbon = 2.8%   nitrogen = 0.78%   sodium = 7.1%
$Al_2O_3$ = 18.3   $SiO_2$ = 72.9%   ash = 83.3%

The above figures are in weight percent. The carbon and nitrogen analyses are reported on the material containing 83.3 percent ash; the sodium, alumina, and silica are reported on an ignited basis (1 hour at 1,000°C). Analyses in the examples that follow are reported similarly.

EXAMPLES 2 – 4

The product of Example 1 was heated in an ammonia atmosphere for 7 hours at 400°, 700° and 900°F. The product of the 700°F treatment was white in color, while the product of the 900°F treatment showed a slight discoloration indicating incipient carbonization of the quaternary cation. Table I lists the chemical composition, in weight percent, after the above heat treatment.

TABLE I

| Catalyst | Carbon | Nitrogen | Ash |
|---|---|---|---|
| ZSM-4 heated 7 hours at 400°F in $NH_3$ | 2.3 | 1.4 | 83.5 |
| ZSM-4 heated 7 hours at 700°F $NH_3$ | <0.03 | 0.52 | 88.9 |
| ZSM-4 heated 7 hours at 900°F in $NH_3$ | 0.09 | 0.13 | 85.2 |

The effectiveness of this treatment is demonstrated by the reduction in the nitrogen and carbon content of the products heated at 700° and 900°F.

EXAMPLES 5 – 7

The product of Example 1 was heated in a steam atmosphere for 7 hours at 400°, 700° and 900°F. Table II also shows a substantial reduction in the carbon and nitrogen content of the product heated at 700° and 900°F.

TABLE II

| Catalyst | Carbon | Nitrogen | Ash |
|---|---|---|---|
| ZSM-4 heated for 7 hours at 400°F in steam | 2.9 | 0.75 | 86.8 |
| ZSM-4 heated for 7 hours at 700°F in steam | 1.9 | 0.51 | 94.7 |
| ZSM-4 heated for 7 hours at 900°F in steam | 0.74 | 0.02 | 97.6 |

While calcination in steam reduces the carbon and nitrogen content, Example 18 below shows one can expect a catalyst of substantially reduced activity.

EXAMPLE 8

The product of Example 1 was calcined for 5 hours in an air atmosphere. The calcined product was ion exchanged with a NaCl solution. The exchange consisted of 10 batch contacts of 10 grams of zeolite with 500 ml. of 10 percent weight NaCl for 10 minutes each at 180°–200°F. The composition of the ion exchangd zeolite was as follows:

Carbon = 0.42%   Nitrogen = 0.09%   Sodium = 7.3%
$Al_2O_3$ = 18.5 %   $SiO_2$ = 37.9%   A = 94.3%

These results show a slight increase in sodium content, as compared to the starting material of Example 1. These figures indicate that 56 percent of the cationic sites initially occupied by the quaternary cations were destroyed by the calcination conducted in an air atmosphere.

EXAMPLE 9

Another sample of ZSM–4 was prepared by mixing the following two solutions for 1 hour:

| Solution 1 | lbs. |
|---|---|
| Q-brand Sodium Silicate (28.9 wt.% $SiO_2$ 8.9% wt. $Na_2O$ | 19.05 |
| NaOH, 50 wt. percent | 3.69 |
| Tetramethylammonium chloride - 50 wt. percent | 1.02 |
| Water | 33.18 |
| Solution 2 | |
| $Al_2(SO_4)_3 .14\ H_2O$ | 3.21 |
| Water | 5.67 |

Two hundred grams of $Na_2SO_4$ was added to the above mixture and heated to 210°F. The crystallized product was formed within 4 days. The composition of the washed product expressed in weight percent was as follows:

| | | |
|---|---|---|
| $SiO_2$ | = | 72.9% |
| $Al_2O_3$ | = | 19.8% |
| Na | = | 6.8% |
| Nitrogen | = | 0.85% |
| Carbon | = | 2.80% |
| Ash | = | 86.0% |
| Equivalents of cation gram atom of aluminum | = | 0.97 |

EXAMPLE 10

50 grams of the product of Example 9 was dried for 10 hours at 210°F and then heated at 700°F for 4 hours in a flowing stream of ammonia. The sample was purged with nitrogen and cooled to room temperature. 5 grams of this product was then ion-exchanged with 1N NaCl solution. The exchange consisted of three batch contacts with 100 ml. of solution at 180°F for 1 hour each. The composition of the heated and exchanged product is shown below in weight percent.

| | | |
|---|---|---|
| $SiO_2$ | = | 69.3 |
| $Al_2O_3$ | = | 18.3 |
| Na | = | 7.9 |
| Nitrogen | = | 0.07 |
| Carbon | = | <0.01 |
| Ash | = | 89.4 |
| equivalents of cation / gram atom of aluminum | = | 0.97 |

This composition indicates that all the original cationic sites, including the cites occupied by the tetramethylammonium cation have been preserved during the calcination process.

EXAMPLE 11

Tetramethylammonium sodalite was prepared as follows:

5.6 grams of aluminum turnings was dissolved in 177.6 grams of 25.1 percent weight tetramethylammonium hydroxide aqueous solution at room temperature. 191 grams of colloidal silica sol was then added to the above solution and mixed for 10 to 15 minutes. The sample was then aged at room temperature for 16 hours and then crystallized in a steam box for 8 days at a temperature of 100°C. The washed and dried product had the following composition expressed in weight percent:

| | | |
|---|---|---|
| $SiO_2$ | = | 81.8% |
| $Al_2O_3$ | = | 15.5% |
| Na | = | 0% |
| Nitrogen | = | 3.29% |
| equivalents of cation / gram atom of aluminum | = | 0.95 |

EXAMPLE 12

The product of Example 11 was dried and heated at 750°F for 4 hours in a flowing stream of ammonia. The sample was purged with nitrogen, cooled and ion-exchanged with 0.1N $Na_2CO_3$ at 180°F. 200 ml. of $Na_2CO_3$ solution per 5 grams of zeolite was used. The exchanged product was washed and dried and had the following composition expressed as weight percent:

| | | |
|---|---|---|
| $SiO_2$ | = | 81.4% |
| $Al_2O_3$ | = | 15.2 |
| Na | = | 4.11 |
| Nitrogen | = | 1.32 |
| equivalents of cation / grams atoms of aluminum | = | 0.97 |

This composition shows that the treatment in an ammonia atmosphere is effective in removing the quaternary cation without a loss of cationic sites.

EXAMPLE 13

Zeolite ZSM-11 was synthesized from the following three solutions: Solution (A) 11 grams of tetrabutylphosphonium chloride dissolved in 152 grams of water. Solution (B) 1 gram of sodium aluminate (30.0 percent $Na_2O$, 43.5% $Al_2O_3$) dissolved in 28 grams of water. Solution (C) 9.9 grams of 98% $H_2SO_4$ diluted with 38 grams of water.

These 3 solutions were added sequentially to 90 grams of Q-brand sodium silicate (28.9% $SiO_2$, 8.9 $Na_2O$) and 140 grams of $H_2O$ with vigorous mixing. The mixture was crystallized in a static bomb-type reactor at 300°F. for 88 hours. The product was washed and dried and had the following molecular formula: $0.66 [(C_4H_9)_4P]_2O \cdot 0.52Na_2O \cdot Al_2O_3 \cdot 48SiO_2$. The analysis of this product in weight percent is given below:

| | | |
|---|---|---|
| $SiO_2$ | = | 94.0 |
| $Al_2O_3$ | = | 3.31 |
| Na | = | 0.79 |
| Phosphorous | = | 1.3 |
| Carbon | = | 7.3 |
| equivalents of cation / gram atom of aluminum | = | 1.2 |

EXAMPLE 14

The dried product of Example 13 was heated for 4 hours at 700°F in a flowing stream of ammonia, cooled to room temperature with a nitrogen purge and ion exchanged twice at 180°F with 0.1N $Na_2CO_3$. The exchange conditions consisted of 200 ml. of 0.1N $Na_2CO_3$ per 5 grams of zeolite. The exchanged product was washed and dried and had the following weight percentage composition:

| | | |
|---|---|---|
| $SiO_2$ | = | 93.4 |
| $Al_2O_3$ | = | 3.10 |
| Sodium | = | 1.3 |
| Phosphorous | = | 0.48 |
| Carbon | = | 2.6 |
| equivalents of cation / gram atom of aluminum | = | 1.2 |

The results indicate that the treatment in an ammonia atmosphere is effective in removing a substantial proportion of the quaternary phosphonium cation without a loss in cationic capacity.

EXAMPLE 15

A portion of the ZSM-4 catalyst produced in Example 9 was ion exchanged with $(NH_4)_2SO_4$. The exchange was carried out by 6 contacts of one hour each at 180°F with a 5 percent weight solution of $(NH_4)_2SO_4$ to produce a tetramethylammonium-ammonium ZSM-4 catalyst. This material was heated for 4 hours at 700°F in a flowing atmosphere of ammonia and then calcined for 1 hour at 1,000°F in an air atmosphere to drive off the ammonia. A similar catalyst was prepared, but it did not receive the ammonia treatment at 700°F. The catalystic activities of both these catalysts were compared for the isomerization of orthoxylene and for the disproportionation of toluene. The liquid phase isomerization of orthoxylene was carried out at 24 LHSV, 375°F, 200 p.s.i.g. for 1 hour. The liquid phase disproportionation of toluene was carried out at 2.5 LHSV, 500°F, 650 p.s.i.g. for 1 hour. The results, tabulated as percent conversion, are listed in Table III.

TABLE III

| CATALYSTS OF EXAMPLE 15 | ISOMERIZATION OF ORTHOXYLENE % CONV. | DISPROPORTIONATION OF TOLUENE %, CONV. |
|---|---|---|
| No $NH_3$ Treatment | 30 | 27 |
| Treated in $NH_3$ at 700°F | 65 | 45 |

These catalytic data indicte that the hydrogen form of ZSM–4 prepared by calcination in an ammonia atmosphere is much more active than conventionally prepared HZSM–4 catalysts.

EXAMPLE 16

The product of Example 14 was calcined for 1 hour at 1,000°F and tested for n-hexane cracking (alpha test). The alpha test was conducted for 5 minutes at 900°F, more particularly described in the *Journal of Catalysis* Volume 4, Number 4, August 1965, pages 527–9 by P. B. Weisz and J. N. Miele. These tests together with that of a standard preparation are shown in Table IV.

TABLE IV

| CATALYST OF EXAMPLE 16 | n-$C_6H_{14}$ % CONVERSION | ALPHA VALUE |
| --- | --- | --- |
| No $NH_3$ Treatment | 24 | 32 |
| Treated in $NH_3$ at 700°F | 49 | 191 |

These results indicate that the ammonia treated sample was six times more active than the sample which was not treated with ammonia.

EXAMPLE 17

Zeolite ZSM–5 was synthesized from the following five solutions: Solution (A) 1 pound sodium aluminate (33.5% wt $Na_2O$, 41.8% wt $Al_2O_3$) dissolved in 25 pounds water, Solution (B) 80 pound of Q-brand sodium silicate dissolved in 100 pounds of water, solution (C) 10 pounds of tetrapropylammonium bromide dissolved in 50 pounds of water, Solution (D) 8 pounds of 97 percent $H_2SO_4$ diluted with 25 pounds of water, and Solution (E) 30 pounds of NaCl dissolved in 36 pounds of water. Solution (C) was added to (B) while mixing and then sequentially, solutions (A), (D) and then (E) were added with agitation. The mixture was heated at about 210°F for 11 days to crystallize the sodium tetrapropylammonium ZSM–5. The zeolite crystals were separated from the mother liquor, washed and dried at about 230°F for 2 hours. The dried material was sized to between 28 and 60 mesh.

One part of this material was heated for 3 hours at 700°F in a flowing stream of $N_2$; another part was treated in a flowing stream of 20% vol. $NH_3$—80 percent vol. $N_2$ for 3 hours at 700°F. Both samples were then ion exchanged by 4 treatments, each with 220 cc of 5% wt $NH_4Cl$ solution per 25 grams of catalyst for 1 hour at room temperature. Both samples were then further ion exchanged by one treatment with a mixture of 225 cc of 0.5N $ZnCl_2$ solutions and 75 cc of 0.5N $NH_4Cl$ solution per 25 grams of catalyst. Both catalysts were washed, dried for 2 hours at 230°F and calcined in air for 3 hours at 900°F.

The activities of these catalysts were measured for reducing the pour point of a Libyan gas oil (80°F pour point, 36°API gravity, 420° – 850°F boiling range) by contacting 0.5 gram of catalyst with 200 cc of gas oil in a 1-liter shaker bomb, pressurizing with $H_2$ to 325 p.s.i.g., heating in 2 to 3 minutes to 700°F and holding at this temperature for the desired reaction period and then quenching the bomb to cool it. The pour point of the reaction product was measured after 1½ hour and 3 hour reaction periods. The results are shown in Table V.

TABLE V

| | Reduction in Pour Point, °F | |
| --- | --- | --- |
| | 1½ hours | 3 hours |
| Catalyst heated in $NH_3$-$N_2$ gas mixture prior to ion exchange | 45 | 80 |
| Catalyst heated in $N_2$ alone prior to ion exchange | 35 | 50 |

These data shown a substantial increase in activity for reduction of pour point when the organic cation, tetrapropylammonium, is removed in the presence of $NH_3$ gas prior to ion exchange.

EXAMPLE 18

A sample of ZSM–5 was calcined at 1,000°F for 3 hours, in a stream of nitrogen, was exchanged in an ammonium nitrate solution, and was then calcined again for 3 hours in ammonia or 100 percent steam at 1,000°F. The effect of the various atmospheres on the activity of the catalyst was determined by measuring conversion of a 50/50 mixture of n-hexane and benzene. The conversion was carried out by passing a stream of the mixed hydrocarbons and hydrogen (3 moles of hydrogen per mole of hydrocarbon) over a bed containing the catalyst at a temperature of 600°F and at 400 p.s.i.g. and a weight hourly spaced velocity of 15. The following table summarizes the results.

TABLE VI

| Calcining Atmosphere | $NH_3$ | Steam |
| --- | --- | --- |
| n—$C_7H_{16}$ Conversion, wt. % | 93.2 | 25.5 |
| $C_6H_6$ Conversion, wt. % | 30.0 | 12.2 |
| $C_7^+$aromatics, wt. % | 28.8 | 12.2 |

These data demonstrate the very drastic reduction in activity of the catalyst sample calcined in steam.

I claim:

1. A process for effecting removal of organic cations which have been introduced into an aluminosilicate zeolite during its crystallization by heating said zeolite at a temperature between about 500°F. and about 1,000°F in an atmosphere consisting essentially of ammonia or mixtures thereof with nitrogen.

2. A process according to claim 1 wherein the organic cation is a quaternary cation.

3. A process according to claim 2 wherein the quaternary cation is selected from a group consisting of tetraalkyl ammonium and tetraalkyl phosphonium ions.

4. A process according to claim 1 where the crystalline aluminosilicate zeolite is selected from a group consisting of ZSM–4, ZSM–11, ZSM–5, ZK–4, ZK–5, and sodalite.

5. A process according to claim 1 where the temperature is between about 600°F. and about 800°F.

6. A process according to claim 1 where the time of said heating is between about 5 minutes and about 24 hours.

7. A process according to claim 1 where the time of said heating is between 10 minutes and 10 hours.

8. A process according to claim 2 where the quaternary cation is tetramethylammonium.

9. A process according to claim 2 where the quaternary cation is tetrapropylammonium.

10. A process according to claim 2 where the quaternary cation is tetrabutylphosphonium.

11. A process according to claim 1 wherein the organic cation is removed prior to ion exchange of the zeolite.

12. The process for reducing the pour point of a gas oil in the presence of a catalyst treated in accordance with the method of claim 1.

13. A process according to claim 1 in which the atmosphere is from about 5 to about 95 percent by volume of ammonia and from about 95 to about 5 percent by volume of nitrogen.

* * * * *